United States Patent
Hegde et al.

(10) Patent No.: US 8,625,582 B2
(45) Date of Patent: Jan. 7, 2014

(54) METHOD AND APPARATUS FOR ROUTING A BEARER PATH IN AN INTERNET PROTOCOL MULTIMEDIA SUBSYSTEM BASED COMMUNICATION SYSTEM

(75) Inventors: Harsha Hegde, Hawthorn Woods, IL (US); Jay P. Jayapalan, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 860 days.

(21) Appl. No.: 12/510,496

(22) Filed: Jul. 28, 2009

(65) Prior Publication Data

US 2010/0039987 A1  Feb. 18, 2010

Related U.S. Application Data

(60) Provisional application No. 61/088,963, filed on Aug. 14, 2008.

(51) Int. Cl.
- *G01R 31/08* (2006.01)
- *H04L 12/66* (2006.01)
- *H04W 72/00* (2009.01)
- *G06F 15/173* (2006.01)
- *H04M 3/00* (2006.01)

(52) U.S. Cl.
USPC ........... 370/354; 370/237; 455/453; 709/239; 379/273

(58) Field of Classification Search
USPC .............. 370/237, 238.1, 352–356, 389, 392, 370/395.32; 455/450, 453; 709/238–244; 379/272–273
See application file for complete search history.

(56) References Cited

U.S. PATENT DOCUMENTS 7,843,902 B2 * 11/2010 Imbimbo et al. .............. 370/352
2003/0214929 A1   11/2003 Bichot et al.
(Continued)

FOREIGN PATENT DOCUMENTS

| EP | 1436962 B1 | 9/2005 |
| EP | 1547306 B1 | 1/2007 |
| EP | 1758339 A2 | 2/2007 |
| WO | 2008040503 A2 | 4/2008 |

OTHER PUBLICATIONS

International Preliminary Report on Patentability and Written Opinion for counterpart International Patent Application No. PCT/US2009/052985 mailed on Feb. 24, 2011.

(Continued)

*Primary Examiner* — Redentor Pasia
(74) *Attorney, Agent, or Firm* — Steven A. May (57) ABSTRACT

A communication system is provided that routes a bearer path of a communication session between an originating Node B and a terminating Node B via an X2 interface, bypassing an IMS core network, while continuing to route the signaling path to an IMS network, thereby allowing the IMS network to retain control of the bearer path while avoiding delay, potential for data loss and jitter to the bearer stream, and additional backhaul capacity requirements that result from routing the bearer path between the originating and terminating Node Bs via the IMS core network. In determining whether the bearer path may bypass the IMS core network, the communication system determines whether IMS core network bearer associated services are required for the communication session such that a bearer path of the call will need to be routed to the IMS core network in order to provide such services.

20 Claims, 6 Drawing Sheets

(56) References Cited

U.S. PATENT DOCUMENTS

| | | |
|---|---|---|
| 2004/0240439 A1 | 12/2004 | Castleberry et al. |
| 2005/0025047 A1* | 2/2005 | Bodin et al. .................. 370/229 |
| 2006/0126595 A1* | 6/2006 | Dahm et al. .................. 370/352 |
| 2006/0206504 A1* | 9/2006 | Cai et al. ....................... 707/100 |
| 2006/0268900 A1* | 11/2006 | Larsson et al. ................ 370/401 |
| 2006/0268921 A1* | 11/2006 | Ekstrom et al. ............... 370/437 |
| 2006/0285537 A1 | 12/2006 | Mahdi |
| 2007/0014262 A1 | 1/2007 | Gras et al. |
| 2007/0293260 A1 | 12/2007 | Xiao et al. |
| 2008/0186964 A1 | 8/2008 | Bedekar et al. |
| 2008/0233974 A1* | 9/2008 | Xu ................................ 455/458 |
| 2009/0318124 A1* | 12/2009 | Haughn ........................ 455/418 |
| 2010/0009675 A1* | 1/2010 | Wijting et al. ............. 455/426.1 |

OTHER PUBLICATIONS

Kim, Jung Hun: "The International Search Report and The Written Opinion of the International Searching Authority", Korean Intellectual Property Office, Daejeon, Republic of Korea, completed: Feb. 22, 2010, mailed: Mar. 2, 2010, all pages.

Perkins, Charles et al.: "Route Optimization in Mobile IP", draft-ietf-mobileip-optim-11.txt, Mobile IP Working Group, Internet Draft, Sep. 6, 2001, all pages.

* cited by examiner

METHOD AND APPARATUS FOR ROUTING A BEARER PATH IN AN INTERNET PROTOCOL MULTIMEDIA SUBSYSTEM BASED COMMUNICATION SYSTEM

CROSS-REFERENCE TO RELATED APPLICATION

This application claims priority from provisional application Ser. No. 61/088,963, entitled "METHOD AND APPARATUS FOR ROUTING OF A BEARER PATH IN AN INTERNET PROTOCOL MULTIMEDIA SUBSYSTEM-BASED COMMUNICATION SYSTEM," and filed Aug. 14, 2008, which is commonly owned and incorporated herein by reference in its entirety.

FIELD OF THE INVENTION

The present invention relates generally to wireless communication systems, and more specifically to bearer path routing in an Internet Protocol Multimedia Subsystem (IMS)-based communication system.

BACKGROUND OF THE INVENTION

In fourth generation communication systems such as a 3GPP LTE (Third Generation Partnership Project Long Term Evolution) system, a 3GPP2 UMB (Third Generation Partnership Project 2 Ultra Mobile Broadband) system, or a WiMAX system, real time packet data services such as Voice over Internet Protocol (VOIP) are expected to be supported using an Internet Protocol Multimedia Subsystem (IMS) core network and session aware edge/border routers (SARs). As a result, it is planned to route all bearer traffic through the IMS core network and the SARs even when there is no need for IMS core services for a call. However, the routing of all calls through the IMS core network adds delay to each call, enhances the potential for data loss and jitter to the bearer stream, and increases the backhaul capacity requirements of the system.

Therefore, a need exists for an improved method and apparatus for propagating bearer data in a fourth generation, IMS-based communication system.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need that exists for an improved method and apparatus for propagating bearer data in a fourth generation, IMS-based communication system, a communication system is provided that routes a bearer path of a communication session between an originating Node B and a terminating Node B via an X2 interface, bypassing an IMS core network, while continuing to route the signaling path to an IMS network, thereby allowing the IMS network to retain control of the bearer path while avoiding delay, potential for data loss and jitter to the bearer stream, and additional backhaul capacity requirements that result from routing the bearer path between the originating and terminating Node Bs via the IMS core network. In determining whether the bearer path may bypass the IMS core network, the communication system determines whether IMS core network bearer associated services are required for the communication session such that a bearer path of the call will need to be routed to the IMS core network in order to provide such services.

Generally, an embodiment of the present invention encompasses a method for routing a bearer path in a wireless communication system. The method includes receiving an invitation to a communication session between an originating mobile station M(S) and a terminating MS and determining whether Internet Protocol Multimedia Subsystem (IMS) core network bearer associated services are required for the communication session such that a bearer path of the call will need to be routed to the IMS core network in order to provide such services. The method further includes, when the communication session does not require IMS core network bearer associated services that require that a bearer path of the communication session be routed to the IMS core network, routing a bearer path over an interface between a first Node B serving the originating MS and a second Node B serving the terminating MS and, concurrent with routing the bearer path over an interface between the first Node B and the second Node B, routing a signaling path for the communication session between the first Node B and the second Node B via the IMS core network.

Another embodiment of the present invention encompasses a method for routing a bearer path in a wireless communication system. The method includes routing a bearer path via an X2 tunnel over an X2 interface between a first Node B serving an originating MS and a second Node B serving a terminating MS, determining to reroute the bearer path through an IMS core network, routing the bearer path through the IMS core network, and canceling the X2 tunnel.

Yet another embodiment of the present invention encompasses a method for handing off a bearer path in a wireless communication system. The method includes routing a bearer path of a communication session via a first tunnel in a first X2 interface between a first Node B serving an originating MS and a second Node B serving a terminating MS and routing a signaling path of the communication session between the first Node B and the second Node B via an IMS core network. The method further includes determining to handoff the terminating MS from the second Node B to a third Node B, switching the bearer path from the first tunnel to a second tunnel in a second X2 interface between the first Node B and the third Node B, and modifying an S1 interface between the third Node B and a gateway such that the signaling path, but not the bearer path, is routed over the S1 interface.

Figure 1:
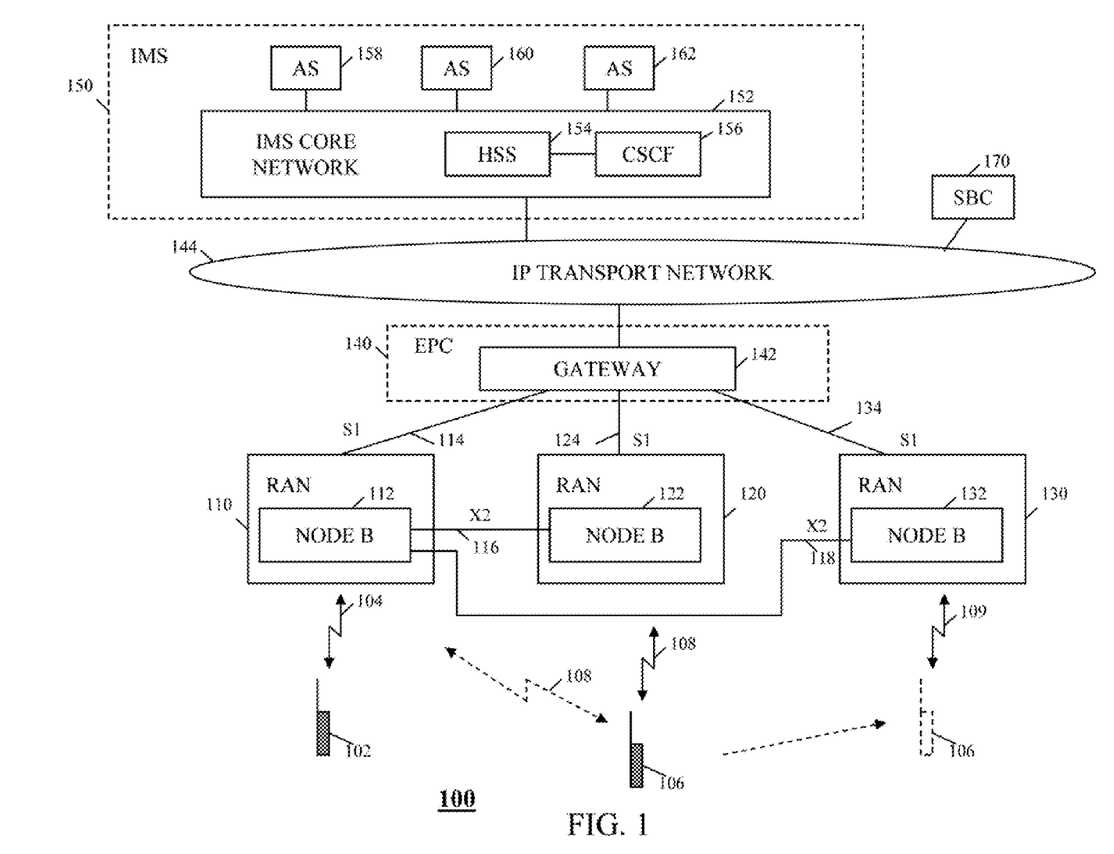
FIG. 1 is a block diagram of a wireless communication system in accordance with an embodiment of the present invention.

Turning now to the drawings, the present invention may be more fully described with reference to FIGS. 1-6. FIG. 1 is a block diagram of a wireless communication system 100 in accordance with various embodiments of the present invention. Communication system 100 includes multiple mobile stations (MSs) 102, 106 (two shown), for example but not limited to a cellular telephone, a radiotelephone, or a Personal Digital Assistant (PDA), personal computer (PC), or laptop computer equipped for wireless communications. In various radio technologies, a mobile station (MS) such as MSs 102 and 106 may be referred to as a user equipment (UE), a subscriber station (SS), an access terminal (AT), or the like.

Communication system 100 further includes multiple Radio Access Networks (RANs) 110, 120, 130 (three shown), preferably evolved Universal Terrestrial Radio Access Networks (E-UTRANs), that each provides wireless communication services to MSs, such as MSs 102 and 106, located in a coverage area of the RANs via a respective air interface 104, 108, and 109. Each air interface 104, 108, 109 includes a forward link that includes a pilot channel, at least one forward link traffic channel, and forward link common and dedicated signaling channels. Each air interface 104, 108, 109 further includes a reverse link that includes at least one reverse link traffic channel, reverse link common and dedicated signaling channels, and an access channel.

Each RAN 110, 120, 130 includes a respective Node B, preferably an evolved Node B (eNode B) 112, 122, 132. Node Bs 112, 122, and 132 may communicate directly with each other via an X2 interface, such as X2 interface 116 between Node Bs 112 and 122 and X2 interface 118 between Node Bs 112 and 132, that provides both control and user plane signaling. Communication system 100 further includes an Evolved Packet Core (EPC) 140 that includes a gateway 142, preferably a Mobility Management Entity and System Architecture Evolution (MME/SAE) gateway that is coupled to each of Node Bs 112, 122, and 132 via a respective S1 interface 114, 124, and 134. For purposes of the present description, gateway 142 includes an MME, a Serving Gateway (S-GW), and a Packet Data Network Gateway (P-GW); however, in other embodiments of the present invention one or more of the MME, S-GW, and P-GW may be implemented in a network entity separate from, and in communication with, the others.

In one embodiment of the present invention, both MS 102 and MS 106 may be in communication with a same RAN, such as RAN 110, and a corresponding Node B, such as Node B 112. In another embodiment of the present invention, each of MS 102 and MS 106 may be in communication with a different RAN, such as RANs 110, 120, and their respective Node Bs 112 and 122.

Communication system 100 further includes an Internet Protocol Multimedia Subsystem (IMS) 150 and a Session Border Controller (SBC) 170 that each are in communication with gateway 142 via an Internet Protocol (IP)-based data network 144. IMS 150 comprises an IMS core network 152 and multiple application servers 158, 160, 162 (three shown), such as a SIP server and multiple application servers. IMS core network 152 includes a Call Session Control Function (CSCF) 156 in communication with a Home Subscriber Server (HSS) 154. Together, RANs 110, 120, and 130, EPC 140, data network 144, IMS 150, and SBC 170 collectively may be referred to as a network of communication system 100.

As is known in the art, the CSCF implements one or more of a Proxy CSCF (P-CSCF), a Serving CSCF (S-CSCF), and an Interrogating CSCF (I-CSCF). The CSCF serves as a centralized routing engine, policy manager, and policy enforcement point to facilitate the delivery of multiple real-time applications using IP transport. It is application-aware and uses dynamic session information to manage network resources (feature servers, media gateways, and edge devices) and to provide advance allocation of these resources depending on the application and user context. The I-CSCF is the contact point within an operator's network for all connections destined for a user of that network, or for a roaming user currently located within that network's service area. The S-CSCF is responsible for identifying the user's service privileges, selecting access to an application server coupled to the IMS network, and providing access to those servers. The P-CSCF is the SIP signaling contact point in the IMS core network for an MS, such as MSs 102 and 104. The P-CSCF is responsible for forwarding Session Initiation Protocol (SIP) registration messages from a subscriber's endpoint, that is, for forwarding call set-up requests and responses to the S-CSCF. P-CSCF maintains a mapping between a logical subscriber SIP Uniform Resource Identifier (URI) address and an MS IP (Internet Protocol) address and a security association for both authentication and confidentiality. Unless otherwise specified herein, the functions performed by IMS 150 preferably are performed by CSCF 156.

Figure 2:
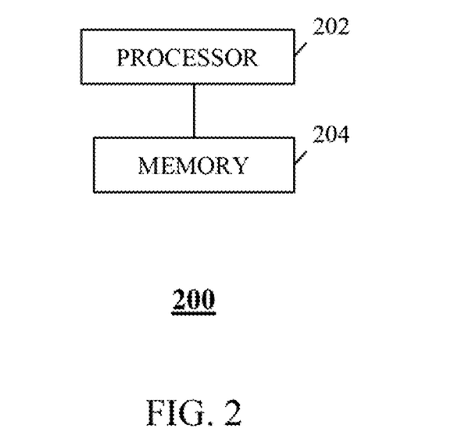
FIG. 2 is a block diagram of a mobile station of FIG. 1 in accordance with an embodiment of the present invention.

Referring now to FIG. 2, a block diagram of an MS 200, such as MSs 102 and 106, is provided in accordance with an embodiment of the present invention. MS 200 includes a processor 202, such as one or more microprocessors, microcontrollers, digital signal processors (DSPs), combinations thereof or such other devices known to those having ordinary skill in the art, which processor is configured to execute the functions described herein as being executed by MS 200. MS 200 further includes an at least one memory device 204, such as random access memory (RAM), dynamic random access memory (DRAM), and/or read only memory (ROM) or equivalents thereof, that is coupled to the processor and that maintains data and programs that may be executed by the associated processor and that allows the UE to perform all functions necessary to operate in communication system 100.

Figure 3:
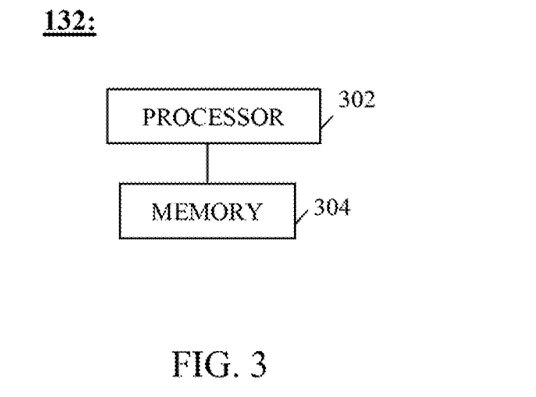
FIG. 3 is a block diagram of a gateway of FIG. 1 in accordance with an embodiment of the present invention.

Referring now to FIG. 3, a block diagram of gateway 142 is provided in accordance with an embodiment of the present invention. Gateway 142 includes a processor 302, such as one or more microprocessors, microcontrollers, digital signal processors (DSPs), combinations thereof or such other devices known to those having ordinary skill in the art, which processor is configured to execute the functions described herein as being executed by the feature server. Gateway 142 further include an at least one memory device 304 that may comprise random access memory (RAM), dynamic random access memory (DRAM), and/or read only memory (ROM) or equivalents thereof, that maintain data and programs that may be executed by the associated processor and that allow the feature server to perform all functions necessary to operate in communication system 100. The at least one memory device 304 further maintains a tunnel management table, which table includes a tunnel identifier (TEIDs) assigned by the gateway in association with each tunnel to a Node B served by the gateway and further maps logical radio channel path identifiers, that is, radio bearer identifiers (RBIDs), that identify radio paths to MSs served by the gateway, such as MSs 102 and 106, to the TEIDs. Preferably, gateway 142 is implemented by processor 302 based on programs and data maintained by at least one memory device 304.

The functionality described herein as being performed by MSs 102 and 106 and by gateway 142 is implemented with or in software programs and instructions stored in the respective at least one memory device 204, 304 of the MSs and gateway and executed by a processor 202, 302 of the MSs and gateway. One of ordinary skill in the art realizes, however, that the embodiments of the present invention alternatively may be implemented in hardware, for example, integrated circuits (ICs), application specific integrated circuits (ASICs), and the like, such as ASICs implemented in one or more of the MSs and gateway. Based on the present disclosure, one skilled in the art will be readily capable of producing and implementing such software and/or hardware without undue experimentation.

Preferably, communication system 100 is a 3GPP (Third Generation Partnership Project) LTE (Long Term Evolution) communication system that provides packet data communication services to subscribers serviced by the network; however, other applicable packet data systems include, but are not limited to, 3GPP2 UMB and WiMAX packet data systems and any one of a variety of wireless packet data communication systems that support multimedia packet data-based communication sessions. To ensure compatibility, radio system parameters and call processing procedures are specified by the standards, including call processing steps that are executed by an MS and a RAN or other access network serving the MS and between the RAN or other access network and associated infrastructure.

In order to avoid the data delays associated with routing a bearer path through an IMS network and to minimize the potential for data loss and jitter to a bearer stream, and further to minimize the requirements for backhaul capacity in the system, communication system 100 provides for a routing of bearer traffic over an X2 interface between originating and terminating Node Bs, bypassing the IMS network, when IMS core network services are not required by a communication session. Meanwhile signaling still is routed to the IMS network, thereby allowing the IMS network to maintain control over the communication session.

Figure 4A:
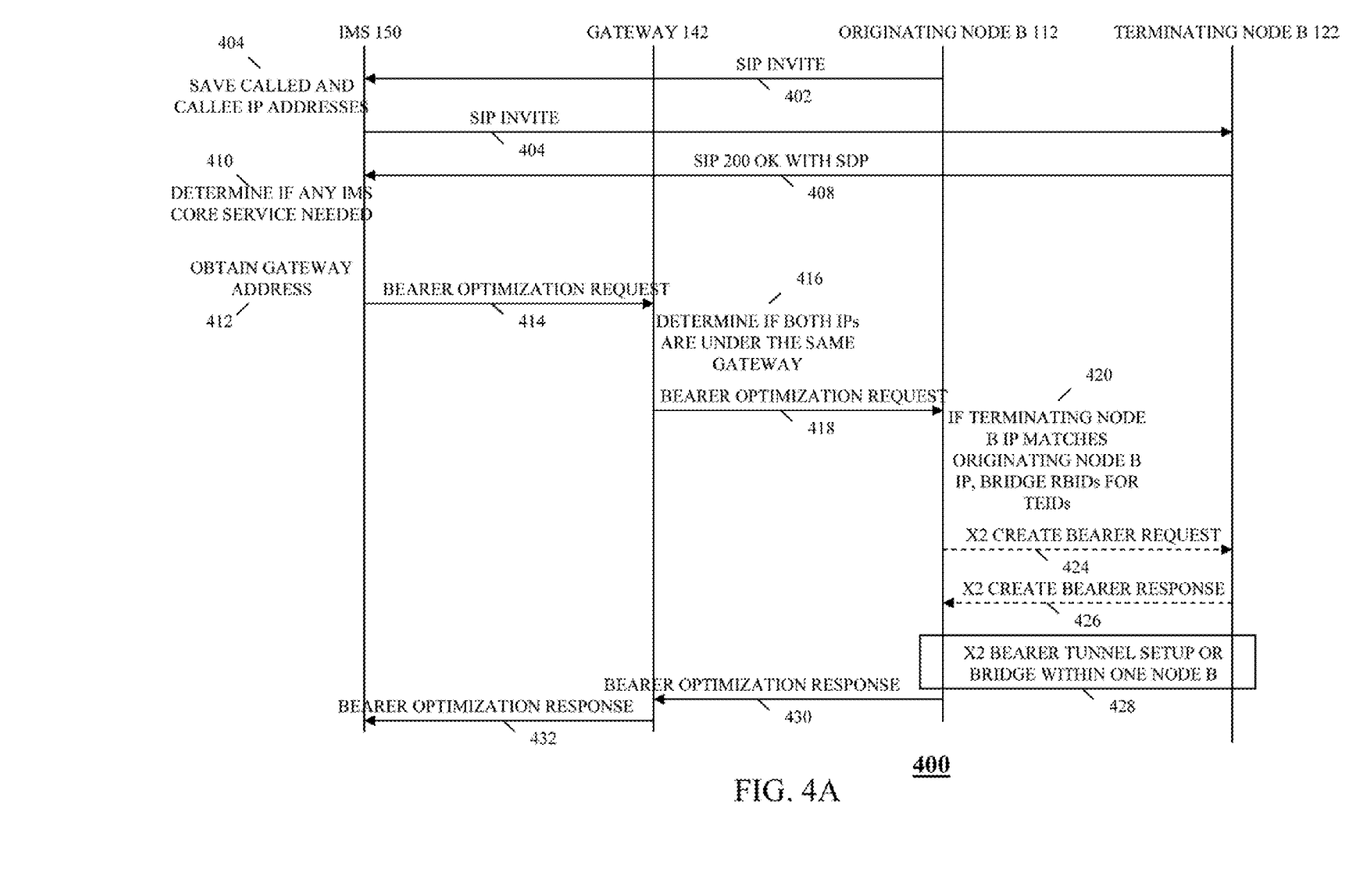
FIG. 4A is a signal flow diagram of a process performed by the communication system of FIG. 1 in routing a bearer path between an originating mobile station (MS) and a terminating MS in accordance with various embodiments of the present invention.

Referring now to FIG. 4, a signal flow diagram 400 is provided that depicts a routing of a bearer path between an originating MS, such as MS 102, and a terminating MS, such as MS 106, in accordance with an embodiment of the present invention. Signal flow diagram 400 begins when a first, originating MS, such as MS 102, attempts to set up a communication session with a second, terminating MS, such as MS 106, via IMS 150. MS 102 initiates the communication session by conveying a first session invitation, preferably a first Session Initiation Protocol (SIP) Invite, to MS 106. More particularly, originating MS 102 conveys 402 the session invitation to IMS 150, and in particular the SIP server, via a first Node B serving the MS, that is, Node B 112, and gateway 142, which session invitation invites the terminating MS 106 to participate in a call. The session invitation includes a callee (calling party) identifier, such as an Internet Protocol (IP) address, associated with the calling party, that is, MS 102, and a destination identifier, such as a Uniform Resource Indicator (URI), associated with the terminating party, that is, MS 106.

In response to receiving the session invitation, IMS 150 determines a called party identifier, preferably an IP address, for MS 106 based on the destination identifier, stores 404 at least a portion of the session invitation, including the calling party identifier and the called party identifier, and conveys 406 a second session invitation to MS 106 via a second Node B serving MS 106. As referred to herein, MS 102, RAN 110, and Node B 112 are on an originating side of the call and may be referred to herein an originating MS, RAN, and Node B. Similarly, MS 106, and a RAN and Node B serving MS 106, are on a terminating side of the call and may be referred to herein as a terminating MS, RAN, and Node B. It may be noted that in one embodiment of the present invention, MSs 102 and 106 may be served by a same RAN and Node B, that is, RAN 110 and Node B 112, in which event RAN 110 and Node B 112 serve as both the originating and the terminating RAN and Node B. However, in another embodiment of the present invention, MSs 102 and 106 may be served by different RANs and Node Bs, for example, where MS 102 is served by RAN 110 and Node B 112 while MS 106 is served by RAN 120 and Node B 122, in which event RAN 120 and Node B 122 are the terminating RAN and Node B.

In response to receiving the session invitation, terminating MS 106 generates a session description protocol (SDP) proposal. As is known in the art, an SDP proposal identifies the parties to the session and identifies the sending MS's capabilities by proposing parameters for participating in the session, for example, a session name and purpose, a type of media involved (video, audio, etc.), a format of the media, a transport protocol, and information needed to receive the media, such as addresses, ports, media formats, and the like. In response to receiving the session invitation from IMS 150 and when a user of terminating MS 106 then answers the call, MS 106 notifies 408 originating MS 102 that the call has been answered by conveying a SIP 200 OK message back to MS 102 via the terminating Node B, gateway 142, IMS 150, and originating Node B, which SIP 200 OK message includes the SDP proposal.

Based on the session invitation and the SDP proposal included in the SIP 200 OK message, IMS 150 determines 410 whether any IMS core network bearer associated services are needed for the call, such as PSTN termination, transcoding, CALEA, E911, three-way calling, voice mail, and packet/bit metering for billing. IMS 150 further obtains 412 routing information, such as IP addresses, of the gateways serving originating MS 102 and terminating MS 106 based on the session invitation received from MS 102 and the SIP 200 OK message received from MS 106 and/or from HSS 154 based on location information, such as a Node B, serving each MS and a corresponding gateway serving each Node B, which location and serving gateway information is maintained by the HSS.

When IMS 150 determines 410 that IMS core network bearer associated services are needed for the communication session such that a bearer path of the call will need to be routed to IMS core network 152 in order to provide such services, for example, PSTN termination, transcoding, CALEA, E911, three-way calling, voice mail, and packet/bit metering for billing, then the IMS routes the call through the IMS system in accordance with well known techniques. However, when IMS 150 determines that the communication session does not require IMS core network bearer associated services that require a routing of a bearer path of the communication session to IMS core network 152, then communication system 100 optimizes the bearer path between originating MS 102 and terminating MS 106, and more particularly between originating Node B 112 and terminating Node B 122, by routing the bearer path directly between the originating and terminating Node Bs, bypassing IMS 150. Meanwhile, the signaling path between the originating and terminating Node Bs will continue to be routed through IMS 150. For example, since signaling information is still being sent to IMS core network 152, IMS core network services that use signaling information only can still be supported when the bearer path bypasses IMS 150, such as billing based on call hold times and call waiting indication. Thus, the delay and potential for data loss and jitter resulting from routing the bearer stream through IMS 150 may be avoided and the backhaul capacity requirements of the system are reduced relative to the prior art while the IMS core is able to maintain control of the call and can connect to the bearer path if a need arises.

More particularly, in response to determining that IMS core network services are not needed for the call, IMS 150 instructs 414 gateway 142 to determine whether user bearer paths for both the originating MS 102 and the terminating MS 106 are handled by a same gateway, by conveying a first Bearer Optimization Request to the gateway. The Bearer Optimization Request includes routing information, preferably IP addresses, for each of MS 102 and MS 106. In response to receiving the Bearer Optimization Request, gateway 142 determines 416 whether user bearer paths for both MS 102 and MS 106 are handled by the same gateway, that is, gateway 142. For example, in one embodiment of the present invention, gateway 142 may check the tunnel management table maintained in the at least one memory device 304 of the gateway to determine whether user bearer paths for both the originating and terminating Node Bs, respectively serving each of MS 102 and MS 106, are handled by the same gateway 142.

In response to determining that user bearer paths for both MS 102 and MS 106 are handled by gateway 142, the gateway executes a bearer optimization process. That is, gateway 142 assigns a flow identifier (flow ID) to a dialogue being set up between the originating and terminating MSs 102, 106 and conveys 418 a second Bearer Optimization Request to originating Node B 112. The second Bearer Optimization Request includes the flow ID, a first tunnel identifier (TEID) that is associated with a pre-existing tunnel between the gateway and originating Node B 112 (an originating TEID), and a second TEID that is associated with a pre-existing tunnel between the gateway and the terminating Node B (terminating TEID), and routing information, such as an IP address, associated with the terminating Node B.

Figure 4B:
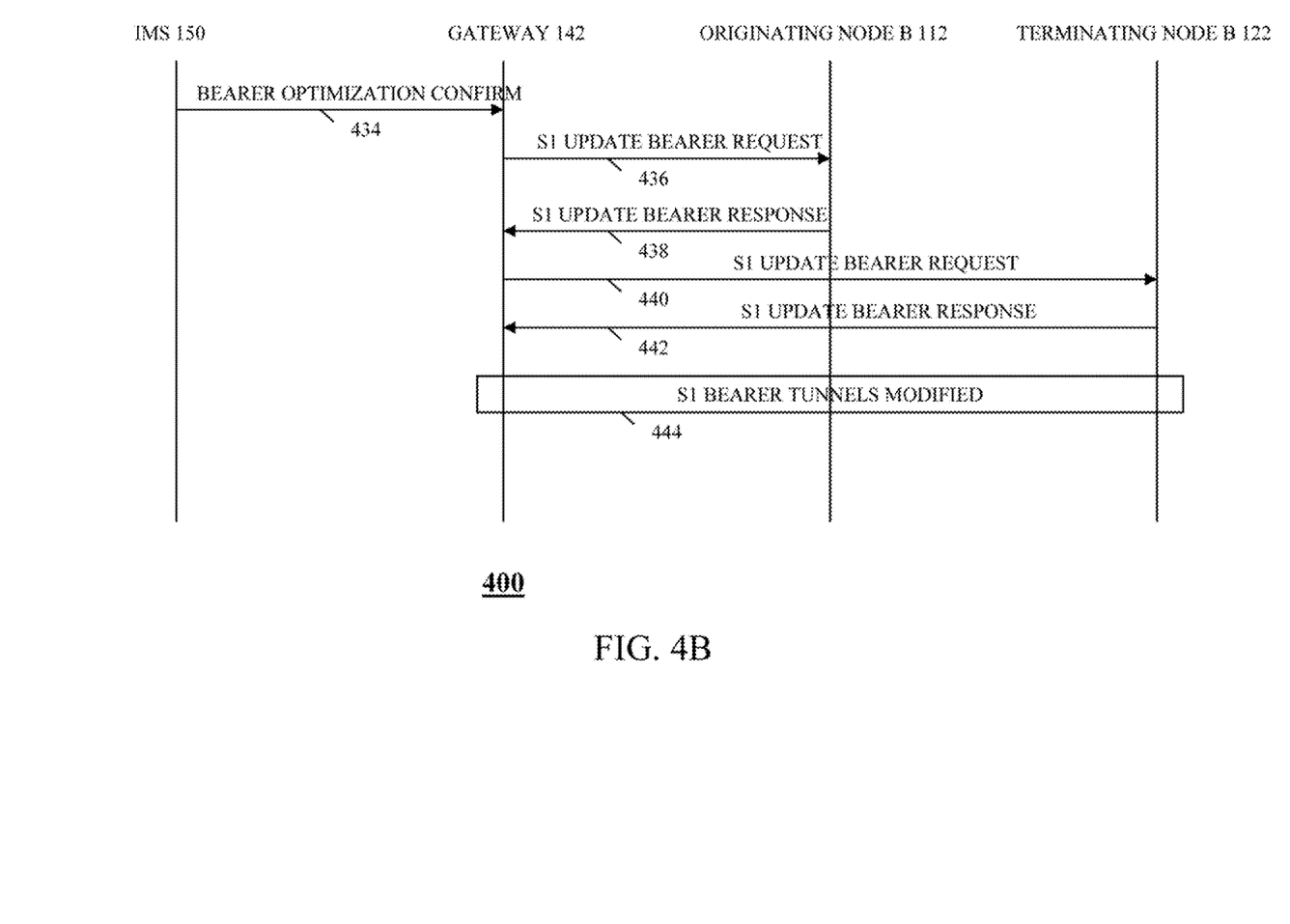
FIG. 4B is a continuation of the signal flow diagram of FIG. 4A depicting a process performed by the communication system of FIG. 1 in routing a bearer path between an originating MS and a terminating MS via an X2 interface in accordance with various embodiments of the present invention.

In response to receiving the second Bearer Optimization Request and based on the IP address associated with the terminating Node B, originating Node B 112 determines 418 whether both originating MS 102 and terminating MS 106 are under a same Node B. That is, Node B 112 determines whether the IP address associated with the terminating Node B matches Node B 112's own IP address. In one embodiment of the present invention, where MS 102 and MS 106 are both served by a same Node B, that is Node B 112, then the two IP addresses should match and, in response, originating Node B 112 bridges 420, 428 logical radio channel paths of each of originating and terminating MSs 102 and 106 by linking, or bridging, logical radio channel path identifiers, that is, radio bearer identifiers (RBIDs), associated with the TEIDs of the originating and terminating Node Bs (that is, Node B 112), and with each of MS 102 and 106, thereby internally (to the Node B) bridging the bearer paths to each of MSs 102 and 106.

If the two IP addresses do not match, then originating Node B 112 sets up 428 an X2 bearer tunnel with the terminating Node B, that is, Node B 122. Preferably, originating Node B 112 sets up the tunnel by conveying 424 a request to set up an X2 bearer tunnel, preferably an X2 Create Bearer Request, to terminating Node B 122 via X2 interface 116, which request includes the flow ID, the originating TEID, and the terminating TEID. In response to receiving the X2 bearer tunnel set up request, terminating Node B 122 conveys 426 a response to the request, preferably an X2 Create Bearer Response, that includes the flow ID and the terminating TEID. Based on the exchanged identifiers, Node Bs 112 and 122 set up 428 an X2 bearer tunnel for data communications between MSs 102 and 106 via X2 interface 116.

Originating Node B 112 informs 430 gateway 142 of the X2 tunnel set up between Node Bs 112 and 122, or the bridging of the radio channel paths within Node B 112, by conveying a first Bearer Optimization Response to the gateway. In response to being informed of the set up of the X2 tunnel or the bridging of radio channel paths, gateway 142 informs 432 IMS 150 of the X2 tunnel set up, or the bridging of the radio channel paths, by conveying a second Bearer Optimization Response to IMS 150. IMS 150 then acknowledges the message and confirms 434 being bypassed in the bearer path between Node B 112 and Node B 122 by conveying a Bearer Optimization Confirmation to gateway 142.

Gateway 142 and each of the originating and terminating Node Bs, that is, Node Bs 112 and 122 if they are different Node Bs, then modify the existing S1 tunnels 114, 124 between the Node Bs and the gateway to permit signaling to continue to be routed through IMS 150 while the bearer path is rerouted to bypass IMS 150. Preferably, gateway 142 instructs 436 originating Node B 112 to no longer tunnel bearer data associated with a communication session between MSs 102 and 106 to the gateway (while continuing to tunnel signaling associated with the communication session to the gateway via S1 tunnel 114) by conveying a first S1 Bearer Request to the Node B. In response to receiving the first S1 Bearer Request, Node B 112 modifies 444 S1 tunnel 114 with gateway 142 accordingly and confirms 438 the modification of the tunnel by conveying a first S1 Bearer Response back to gateway 142. Similarly, gateway 142 instructs 440 the terminating Node B, such as Node B 122, to no longer tunnel bearer data associated with a communication session between MSs 102 and 106 to the gateway (while continuing to tunnel signaling associated with the communication session to the gateway via S1 tunnel 124) by conveying a second S1 Bearer Request to the terminating Node B. In response to receiving the S1 Bearer Request, the terminating Node B modifies 444 its S1 tunnel, such as S1 tunnel 124, with gateway 142 accordingly and confirms 442 the modification by conveying a second S1 Bearer Response back to gateway 142. Signal flow diagram 400 then ends.

Figure 5:
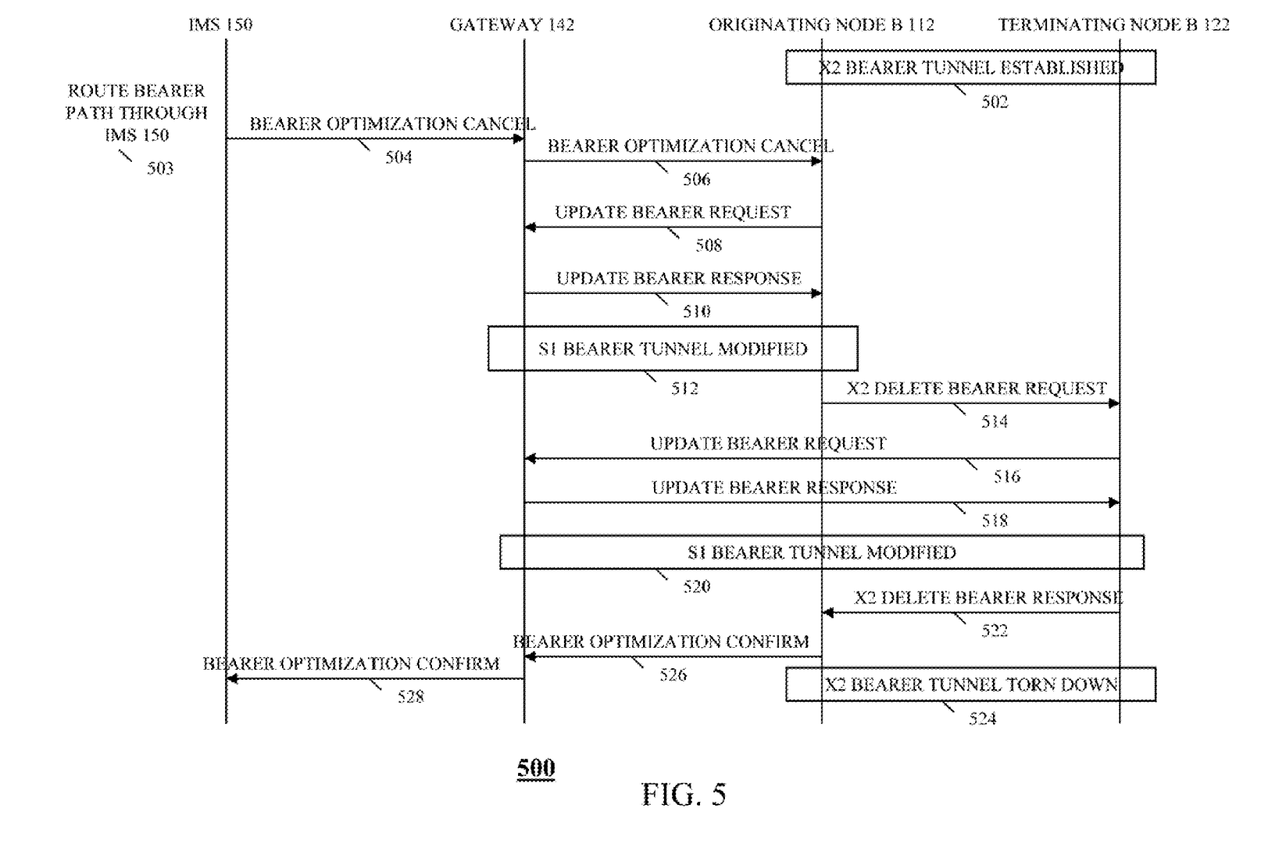
FIG. 5 is a signal flow diagram depicting a process performed by the communication system of FIG. 1 whereby an Internet Protocol Multimedia Subsystem (IMS) of FIG. 1 reroutes a bearer path from an X2 interface to the IMS in accordance with an embodiment of the present invention.

Communication system 100 further provides for IMS 150 to reroute, to the IMS, a bearer path that is currently routed over an intra- or inter-Node B interface (bypassing IMS 150) and to cancel the intra- or inter-Node B bearer path. For example, IMS 150 may decide to return bring back the bearer path in order to add IMS services to a communication session, such as interception services. Referring now to FIG. 5, a signal flow diagram 500 is provided that depicts a process whereby IMS 150 brings the bearer path back to the IMS in accordance with an embodiment of the present invention. Signal flow diagram 500 begins when an inter-Node B X2 tunnel has already been established 502 between an originating Node B, such as Node B 112, and a terminating Node B, such as Node B 122, via an intervening X2 interface, that is, X2 interface 116. IMS 150 then determines 503 to reroute the bearer path through the IMS 150 network and initiates the rerouting of the bearer path by instructing 504 gateway 142 to cancel the X2 tunnel between originating Node B 112 and terminating Node B 122 and to reroute the bearer path back to IMS 150. Preferably IMS 150 instructs the gateway to cancel the X2 tunnel and to reroute the bearer path back to the IMS by conveying a first Bearer Optimization Cancel message that includes the flow ID associated with the communication session between MS 102 and MS 106.

In response to receiving the instruction to cancel the X2 tunnel from IMS 150, gateway 142 instructs 506 originating Node B 112 to cancel the X2 tunnel by conveying, to the Node B, a second Bearer Optimization Cancel message that includes the flow ID. In conveying the second Bearer Optimization Cancel message, gateway 142 may just forward the first Bearer Optimization Cancel message. In response to receiving the instruction to cancel the X2 tunnel from gateway 142, originating Node B 112 requests 508 of gateway 142, preferably by conveying a first Update Bearer Request, that the modification of the S1 bearer tunnel between the originating Node B and the gateway be undone so that the bearer path may be rerouted to gateway 142 over S1 interface 114, and via the gateway to IMS 150. Gateway 142 acknowledges 510 receipt of the request to undo the modification of the bearer tunnel by conveying a first Update Bearer Response to Node B 112, and the Node B and gateway modify 512 the S1 tunnel between the Node B and the gateway to tunnel the bearer path over S1 tunnel 114.

Further in response to receiving the instruction to cancel the X2 tunnel from gateway 142, originating Node B 112 requests 514 that terminating Node B 122 cancel the X2 tunnel between the originating Node B and the terminating Node B, preferably by conveying an X2 Delete Bearer Request to the terminating Node B. In response to receiving the request to cancel the X2 tunnel, terminating Node B 122 requests 516 of gateway 142, preferably by conveying a second Update Bearer Request, that the modification of the S1 bearer tunnel between the terminating Node B and the gateway be undone so that the bearer path may be rerouted to gateway 142 over S1 interface 124, and via the gateway to IMS 150. Gateway 142 acknowledges 518 receipt of the request to undo the modification of the bearer tunnel by conveying a second Update Bearer Response to Node B 112, and the Node B and gateway modify 520 the S1 tunnel between the Node B and the gateway to tunnel the bearer path over S1 interface 124.

In response to the modification of the S1 bearer tunnel between terminating Node B 122 and gateway 142, that is, to the rerouting of the bearer path over S1 interface 124, terminating Node B 122 confirms 522 to originating Node B 112 that the X2 tunnel may be torn down by conveying an X2 Delete Bearer Response to the originating Node B. Originating Node B 122 and terminating Node B 112 then tear down 524 the X2 tunnel that they had set up for the communication session between originating MS 102 and terminating MS 106. Further, in response to receiving the X2 Delete Bearer Response from terminating Node B 122, originating Node B 112 confirms 526 to gateway 142 that the X2 tunnel has been torn down and that the bearer path is being rerouted over S1 interfaces 114 and 124 by conveying a first Bearer Optimization Confirm message to gateway 142. In turn, in response to receiving the first Bearer Optimization Confirm message, gateway 142 informs IMS 150 that the bearer path has been rerouted back to the IMS by conveying a second Bearer Optimization Confirm message to IMS 150. Logic flow 500 then ends.

By routing a bearer path between originating Node B 112 and terminating Node B 122 via X2 interface 116 and bypassing IMS core network 152, while continuing to route the signaling path to IMS network 150, communication system 100 avoids delay, potential for data loss and jitter to the bearer stream, and additional backhaul capacity requirements that result from routing the bearer path between the originating and terminating Node Bs via the IMS core network while allowing the IMS network to retain control of the bearer path. In order to determine whether the bearer path may bypass the IMS core network, communication system 100 determines whether IMS core network bearer associated services are required for the communication session such that a bearer path of the call will need to be routed to the IMS core network in order to provide such services. Communication system 100 then may route the bearer path over the X2 interface, bypassing the IMS core network, when the communication session does not require such IMS core network bearer associated services.

Figure 6:
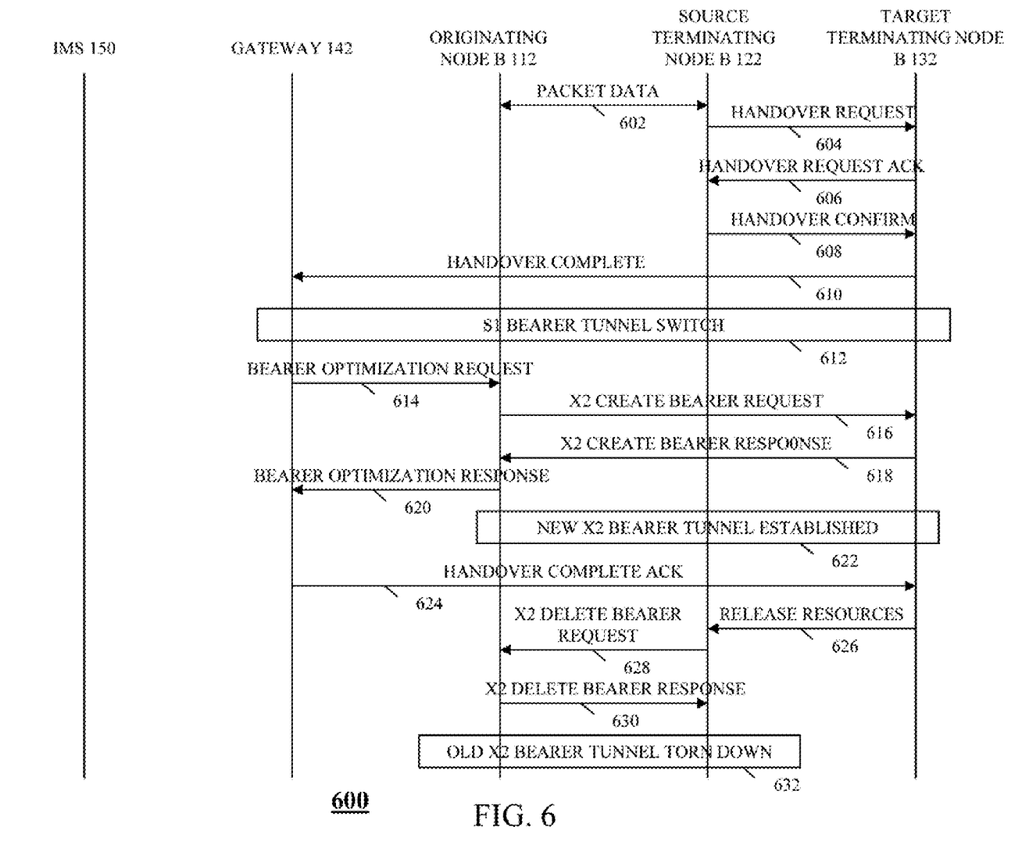
FIG. 6 is a signal flow diagram depicting a process performed by the communication system of FIG. 1 in handing over a communication session among X2 interfaces in accordance with an embodiment of the present invention.

Communication system 100 further provides for a handoff of an inter-Node B bearer path wherein IMS 150 continues to be bypassed by the bearer path. Referring now to FIG. 6, a signal flow diagram 600 is provided that depicts a handoff of the bearer path in accordance with an embodiment of the present invention. Signal flow diagram 600 begins when a first, originating MS 102 and a second, terminating MS 106 are engaged in a communication session wherein bearer data is exchanged 602 between a first, originating Node B, such as Node B 112, and a second, terminating Node B, such as Node B 122, via a first X2 tunnel over a first X2 interface, such as X2 interface 116. Concurrent with the bearer path being routed over the first X2 tunnel, a signaling path for the communication session is routed between Node Bs 112 and 122 via IMS 150.

At some point during the communication session, terminating MS 106 roams to a coverage area of a target terminating Node B, such as Node B 132. As a result, a decision is made to handoff the target MS 106 from the source terminating Node B, that is, Node B 122, to the target terminating Node B, that is, Node B 132. Assuming the handoff is MS-initiated, terminating MS 106 requests of the Node B serving the MS, that is, source terminating Node B 122, that the MS be handed off to the third, target terminating Node B 132 by conveying a Handover Request to the source terminating Node B 122. However, in other embodiments of the invention, the handoff may be network-initiated and may be based on air interface measurements made by either the MS or the network, as the basis for the handoff and the device initiating the handoff are not critical to the present invention.

In response to receiving the handover request, source terminating Node B 122 requests 604 a handoff of MS 106 to target terminating Node B 132, preferably by conveying a Handover Request to the target terminating Node B. The Handover Request includes all relevant handoff information, such as identifiers of the MS and the target terminating Node B, a packet data convergence protocol (PDCP) context, and so on. In response to receiving the Handover Request, target terminating Node B 132 sets up connections to support the MS 106's packet data communication session and conveys 606 a Handover Request ACK message back to source terminating Node B 122, which message includes information for establishment of the new radio link at the target terminating Node B, such as radio channels allocated to the MS at the target terminating Node B. Source terminating Node B 122 then instructs MS 106 to move to the radio channels allocated to the MS at target terminating Node B 132 by conveying a Handover Command message to the MS.

Terminating MS 106 then tunes to the indicated radio channels at target terminating Node B 132 and informs source terminating Node B 132 of the success of the handover by conveying a Handover Confirmation message to the source terminating Node B 132. Source terminating Node B forwards the Handover Confirmation message to target terminating Node B 132 and the target terminating Node B informs 610 gateway 132 that it has established a connection with MS 106 and initiates a bearer path switch by conveying a conveying a Handover Complete message to the gateway 142.

As part of the handoff, the bearer path for the communication session is being switched from the first X2 interface and X2 tunnel to a second X2 tunnel over a second X2 interface 118 between originating Node B 112 and target terminating Node B 132. Meanwhile the signaling path will continue to be routed though IMS 150. That is, in response to being informed that target terminating Node B 132 has acquired terminating MS 106, gateway 142 negotiates 612 a modification of an S1 bearer tunnel between the gateway and target terminating Node B 132, as the bearer path for MS 106 will not be routed over S1 interface 134 between the gateway and target terminating Node B while the signaling path will be routed over the S1 interface. Gateway 142 conveys 614 a Bearer Optimization Request to originating Node B 112, which Bearer Optimization Request includes a flow identifier (flow ID) associated with the communication session, a tunnel identifier (TEID) that is associated with the tunnel between the gateway and originating Node B 112 (an originating TEID), a TEID that is associated with a pre-existing tunnel between the gateway and target terminating Node B 132 (target terminating TEID), and an IP address associated with the target terminating Node B.

Originating Node B 112 then sets up 622 an X2 bearer tunnel with the target terminating Node B 132. Preferably, originating Node B 112 sets up the tunnel by conveying 616 a request to set up an X2 bearer tunnel, preferably an X2 Create Bearer Request, to target terminating Node B 132, which request includes the flow ID associated with the communication session, the originating TEID, and the target terminating TEID. In response to receiving the X2 bearer tunnel set up request, target terminating Node B 132 conveys 618 a response to the request, preferably an X2 Create Bearer Response, that includes the flow ID and the terminating TEID. Based on the exchanged identifiers, Node Bs 112 and 132 set up 622 the second X2 bearer tunnel over X2 interface 118 for data communications between MSs 102 and 106. Originating Node B 112 then conveys data to MS 106 via each of the first X2 tunnel existing with source terminating Node B 112 and the second X2 tunnel set up with target terminating Node B 132.

Originating Node B 112 further informs 620 gateway 142 of the X2 tunnel set up between Node Bs 112 and 132 by conveying a Bearer Optimization Response to the gateway. In response to being informed of the set up of the X2 tunnel, gateway 142 initiates 624 a switch of the bearer path from the X2 tunnel between originating Node B 112 and source terminating Node B 122 to the X2 tunnel between originating Node B 112 and target terminating Node B 132, by conveying a Handover Complete ACK message to target terminating Node B 132. In response to receiving the Handover Complete ACK message, target terminating Node B 132 conveys a release resource message to source terminating Node B 122 and the source terminating Node B flushes its downlink data buffer of any data stored for retransmissions to MS 106. However, any in-transit data packets received by source terminating Node B 122 still are forwarded to MS 106.

In response to receiving the release resource message, source terminating Node B 122 releases all resources allocated to MS 106 and instructs 628 originating Node B 112 to cancel the X2 tunnel between the originating Node B and source terminating Node B 122, preferably by conveying an X2 Delete Bearer Request to the originating Node B. Originating Node B 112 acknowledges 630 receipt of the request to cancel the X2 tunnel by conveying an X2 Delete Bearer Request to source terminating Node B 122, and the originating Node B and the source terminating Node B and tear down 632 the X2 bearer tunnel between them. Signal flow 600 then ends.

By providing for a handing off of a bearer path from one X2 interface to another X2 interface when a terminating MS is handed off from one terminating Node B to another terminating Node B, communication system 100 maintains a routing of a bearer path between originating and terminating MSs that bypasses an IMS core network even when a communication session is handed off. Meanwhile, the signaling path continues to routed to the IMS network, allowing the IMS network to retain control of the bearer path.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, "conference call" and "three-way call" are interchangeable terms. Further, as used here, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by "a . . . " does not, without more constraints, preclude the existence of additional identical elements in the process, method, article, or apparatus.

What is claimed is:

1. A method for routing a bearer path in a wireless communication system, the method comprising:

receiving an invitation to a communication session between an originating mobile station and a terminating mobile station;

determining whether Internet Protocol Multimedia Subsystem (IMS) core network bearer associated services are required for the communication session such that a bearer path of the communication session will need to be routed to an IMS core network in order to provide such services;

when the communication session does not require the IMS core network bearer associated services that require that a the bearer path of the communication session be routed to the IMS core network, routing a bearer path over an interface between a first Node B serving the originating mobile station and a second Node B serving the terminating mobile station; and concurrent with routing the bearer path over the interface between the first Node B and the second Node B, routing a signaling path for the communication session between the first Node B and the second Node B via the IMS core network to allow the IMS core network to maintain control over the communication session.

2. The method of claim 1, wherein the interface between the first Node B and the second Node B is an X2 interface.

3. The method of claim 2, wherein routing a bearer path over an X2 interface between the first Node B and the second Node B comprises conveying, by the Internet Protocol Multimedia Subsystem (IMS) core network to a gateway serving the Node Bs, a Bearer Optimization Request that comprises routing information for each of the originating mobile station and the terminating mobile station.

4. The method of claim 3, wherein the Bearer Optimization Request comprises a first Bearer Optimization Request and wherein routing a bearer path over an interface between the first Node B and the second Node B comprises:

receiving, by the gateway, the first Bearer Optimization Request; and in response to receiving the first Bearer Optimization Request, conveying, by the gateway, a second Bearer Optimization Request to the first Node B, wherein the second Bearer Optimization Request comprises a flow identifier, a tunnel identifier associated with the first Node B, and a tunnel identifier associated with the second Node B.

5. The method of claim 4, wherein routing a bearer path over an interface between the first Node B and the second Node B comprises:

determining, by the first Node B and based on the second Bearer Optimization Request, whether the first Node B and the second Node B are a same Node B; and when the IMS core network bearer associated services are not required for the communication session and the first Node B and the second Node B are the same Node B, internally bridging, by the Node B, a bearer path to the originating mobile station with a bearer path to the terminating mobile station and bypassing the Internet Protocol Multimedia Subsystem (IMS) core network.

6. The method of claim 1, further comprising, routing the bearer path through the IMS core network when the IMS core network bearer associated services are required for the communication session.

7. The method of claim 1, wherein routing a bearer path over an interface and routing a signaling path for the communication session via the Internet Protocol Multimedia Subsystem (IMS) core network comprises modifying an S1 interface between the first Node B and a gateway such that the signaling path, but not the bearer path, is routed over the S1 interface.

8. The method of claim 7, further comprising:

informing the gateway, by the first Node B, of the routing of the bearer path over the interface between the first Node B and the second Node B; and informing the Internet Protocol Multimedia Subsystem core network, by the gateway, of the routing of the bearer path over the interface between the first Node B and the second Node B.

9. The method of claim 1, wherein routing a bearer path over an interface between the first Node B and the second Node B comprises:

determining whether user bearer paths for both the first Node B and the second Node B are handled by a same gateway; and when the IMS core network bearer associated services are not required for the communication session and both mobiles are served by the same gateway, routing a bearer path over an X2 interface between the first Node B and the second Node B.

10. The method of claim 1, wherein routing a bearer path over an X2 interface between the first Node B sand the second Node B comprises:

conveying, by the first Node B to the second Node B, an X2 Create Bearer Request that comprises a flow identifier, an originating tunnel identifier, and a terminating tunnel identifier; and in response to conveying the X2 Create Bearer Request, receiving, by the first Node B, an X2 Create Bearer Response that comprises the flow identifier and the terminating tunnel identifier.

11. An apparatus for routing a bearer path in a wireless communication system, the apparatus comprising:

an Internet Protocol Multimedia Subsystem (IMS) core network that receives an invitation to a communication session between an originating mobile station and a terminating mobile station and determines whether Internet Protocol Multimedia Subsystem (IMS) core network bearer associated services are required for the communication session such that a bearer path of the communication session will need to be routed to the IMS core network in order to provide such services;

a plurality of Node Bs, wherein when the communication session does not require IMS core network bearer associated services that require that the bearer path of the communication session be routed to the IMS core network, the bearer path is routed over an interface between a first Node B of the plurality of Node Bs serving the originating mobile station and a second Node B of the plurality of Node Bs serving the terminating mobile station; and wherein, concurrent with routing the bearer path over a-n the interface between the first Node B and the second Node B, a signaling path for the communication session is routed between the first Node B and the second Node B via the IMS core network to allow the IMS core network to maintain control over the communication session.

12. The apparatus of claim 11, wherein the interface between the first Node B and the second Node B is an X2 interface.

13. The apparatus of claim 12, further comprising a gateway serving the first Node B and the second Node B and wherein routing a bearer path over an X2 interface between the first Node B and the second Node B comprises conveying, by the Internet Protocol Multimedia Subsystem (IMS) core network to the gateway, a Bearer Optimization Request that comprises routing information for each of the originating mobile station and the terminating mobile station.

14. The apparatus of claim 13, wherein the Bearer Optimization Request comprises a first Bearer Optimization Request and wherein routing a bearer path over an interface between the first Node B and the second Node B comprises:

receiving, by the gateway, the first Bearer Optimization Request; and in response to receiving the first Bearer Optimization Request, conveying, by the gateway, a second Bearer Optimization Request to the first Node B, wherein the second Bearer Optimization Request comprises a flow identifier, a tunnel identifier associated with the first Node B, and a tunnel identifier associated with the second Node B.

15. The apparatus of claim 14, wherein routing a bearer path over an interface between the first Node B and the second Node B comprises:
   determining, by the first Node B and based on the second Bearer Optimization Request, whether the first Node B and the second Node B are a same Node B; and
   when the IMS core network bearer associated services are not required for the communication session and the first Node B and the second Node B are the same Node B, internally bridging, by the Node B, a bearer path to the originating mobile station with a bearer path to the terminating mobile station and bypassing the Internet Protocol Multimedia Subsystem (IMS) core network.

16. The apparatus of claim 12, wherein routing a bearer path over an X2 interface between the first Node B and the second Node B comprises:
   conveying, by the first Node B to the second Node B, an X2 Create Bearer Request that comprises a flow identifier, an originating tunnel identifier, and a terminating tunnel identifier; and
   in response to conveying the X2 Create Bearer Request, receiving, by the first Node B, an X2 Create Bearer Response that comprises the flow identifier and the terminating tunnel identifier.

17. The apparatus of claim 11, further comprising routing the bearer path through the Internet Protocol Multimedia Subsystem (IMS) core network when the IMS core network bearer associated services are required for the communication session.

18. The apparatus of claim 11, further comprising a gateway serving the first Node B and the second Node B and wherein routing a bearer path over an interface and routing a signaling path for the communication session via the Internet Protocol Multimedia Subsystem (IMS) core network comprises modifying an S1 interface between the first Node B and the gateway such that the signaling path, but not the bearer path, is routed over the S1 interface.

19. The apparatus of claim 18, further comprising:
   informing the gateway, by the first Node B, of the routing of the bearer path over the interface between the first Node B and the second Node B; and
   informing the Internet Protocol Multimedia Subsystem core network, by the gateway, of the routing of the bearer path over the interface between the first Node B and the second Node B.

20. The apparatus of claim 11, further comprising a gateway that determines whether user bearer paths for both the first Node B and the second Node B are handled by the gateway and, when the Internet Protocol Multimedia Subsystem (IMS) core network bearer associated services are not required for the communication session and both mobile stations are served by the gateway, routes a bearer path over an X2 interface between the first Node B and the second Node B.

* * * * *